United States Patent
Kuo

(10) Patent No.: US 8,791,922 B2
(45) Date of Patent: Jul. 29, 2014

(54) RESISTIVE TOUCH PANEL

(75) Inventor: Tsung-Hua Kuo, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 78 days.

(21) Appl. No.: 13/478,118

(22) Filed: May 23, 2012

(65) Prior Publication Data

US 2013/0009908 A1    Jan. 10, 2013

(30) Foreign Application Priority Data

Jul. 7, 2011    (TW) ............................. 100124047 A

(51) Int. Cl.
   *G06F 3/045*    (2006.01)

(52) U.S. Cl.
   USPC ....................................... 345/174; 178/18.05

(58) Field of Classification Search
   CPC .................... G06F 3/041; G06F 3/045; G06F 2203/04104; G06F 2203/04105
   USPC .......... 178/18.01, 18.03, 18.05; 345/173, 174
   See application file for complete search history.

(56) References Cited

U.S. PATENT DOCUMENTS

2009/0314551 A1* 12/2009 Nakajima ................... 178/18.05
2010/0277417 A1* 11/2010 Sarasmo ........................ 345/173

FOREIGN PATENT DOCUMENTS

| JP | 2005049978 A | * | 2/2005 | ............. G06F 3/033 |
| JP | 2010140149 A | * | 6/2010 | |
| TW | 201005621 | | 2/2010 | |

OTHER PUBLICATIONS

English translation of JP 2005049978 A.*
English translation of JP 2010140149 A.*
"Office Action of Taiwan Counterpart Application", issued on Feb. 26, 2014, p. 1-p. 6.

* cited by examiner

*Primary Examiner* — Nathan Danielsen
(74) *Attorney, Agent, or Firm* — Jianq Chyun IP Office

(57) ABSTRACT

A resistive touch panel is provided. The resistive touch panel includes a first conductive layer and a second conductive layer, and a plurality of electrodes is disposed on the first conductive layer and the second conductive layer. A detection area of the resistive touch panel is separated into at least two sub-detection areas through configuration of the electrodes. Thus, the resistive touch panel can calculate coordinates of a contact point corresponding to each sub-detection area at the same time, so as to achieve functions of detecting multiple touch points at the same time and detecting touch point sliding.

8 Claims, 5 Drawing Sheets

RESISTIVE TOUCH PANEL

CROSS-REFERENCE TO RELATED APPLICATION

This application claims the priority benefit of Taiwan application serial no. 100124047, filed on Jul. 7, 2011. The entirety of the above-mentioned patent application is hereby incorporated by reference herein and made a part of this specification.

BACKGROUND OF THE INVENTION

1. Field of the Invention

The invention relates to a touch panel. Particularly, the invention relates to a resistive touch panel.

2. Description of Related Art

With quick development of technology, to achieve features of easy carry, small size, and intuitive and user-friendly operation, input devices of many information products (for example, mobile phones, tablet PCs, and computer screens, etc) have changed from conventional keyboards and mouses to touch panels. The touch panel can also be referred to as a touch screen or a soft-touch screen, etc.

Divided by detection techniques of touch points, the touch panels include resistive, capacitive, acoustic sensing, infrared sensing, electromagnetic induction touch panels, etc. FIG. 1 is a schematic diagram illustrating a touch principle of a resistive touch panel 100. As shown in FIG. 1, the resistive touch panel 100 is composed of two even resistive conductive layers 110 and 120. The resistive conductive layers 110 and 120 can be indium tin oxide layers formed by indium tin oxide (ITO). Soft spacers 130 are disposed between the two resistive conductive layers 110 and 120 for spacing the resistive conductive layers 110 and 120 to avoid mutual contact there between.

In this way, under a pressure of user's finger 150 or a penpoint, the soft resistive conductive layer 110 contacts the conductive layer 120 as that shown by dot lines of FIG. 1, and the touch panel 100 obtains a corresponding touch point, so that the information product can execute a corresponding operation. Therefore, the touch panel 100 can replace a mechanical button panel and present a vivid image effect through a liquid crystal screen.

Limited by an operation principle of the conventional resistive touch panel (for example, a conductive layer structure of a 4-wire or a 5-wire resistive touch panel, and a touch point detecting method thereof), only coordinates of a single touch point can be detected when the user touches the touch panel. When there are more than two touch points, correct coordinate values of the touch points cannot be detected, not to mention to detect whether the touch point slides. Therefore, the conventional resistive touch panel is hard to implement a multi-touch function and detection for touch point sliding.

SUMMARY OF THE INVENTION

The invention is directed to a resistive touch panel, in which a detection area of the resistive touch panel is divided into a plurality of sub-detection areas through configuration of a plurality of electrodes (for example, at least six electrodes), and coordinates of touch points corresponding to the sub-detection areas are calculated at the same time, so as to achieve functions of detecting multiple touch points at the same time and detecting touch point sliding.

The invention provides a resistive touch panel. The resistive touch panel includes a first conductive layer and a second conductive layer, and a plurality of electrodes is disposed on the first conductive layer and the second conductive layer. The electrodes divide a detection area of the resistive touch panel into at least two sub-detection areas. Moreover, the first conductive layer and the second conductive layer are respectively formed by an indium tin oxide (ITO) layer.

In an embodiment of the invention, the electrodes include a first to sixth electrodes. Configuration positions of the first electrode, the second electrode and the third electrode are parallel to each other, and are perpendicular to a first direction (for example, an X-axis direction). The second electrode is disposed between the first electrode and the third electrode. Configuration positions of the fourth electrode, the fifth electrode and the sixth electrode are also parallel to each other, and are perpendicular to a second direction (for example, a Y-axis direction). The second electrode separates the fourth electrode and the fifth electrode, and the sixth electrode is disposed between the first electrode and the third electrode. In this way, the second electrode divides the detection area into two sub-detection areas of a first sub-detection area and a second sub-detection area.

In an embodiment of the invention, the first electrode, the second electrode and the third electrode are disposed on the first conductive layer. The fourth electrode, the fifth electrode and the sixth electrode are disposed on the second conductive layer. Moreover, the fourth electrode and the fifth electrode are disposed on a same straight line.

In an embodiment of the invention, the resistive touch panel further includes a position processor. The position processor controls voltage levels of the first to sixth electrodes, and selectively receives a plurality of detection results from the electrodes to determine two touch points of a first touch point and a second touch point corresponding to the at least two sub-detection areas.

In an embodiment of the invention, the position processor includes a high impedance analog-to-digital converter (ADC) and a control unit. The ADC receives the detection results of analog-type from the first electrode and the third electrode, or from the fourth electrode and the fifth electrode for converting into the detection results of digital-type. The control unit controls the voltage levels of the electrodes to determine the first touch point and the second touch point corresponding to the first sub-detection area and the second sub-detection area according to the detection results.

In an embodiment of the invention, during a first dimension detection period (for example, a period of detecting X-dimension coordinates), the control unit provides a first reference voltage to the first electrode and the third electrode, and provides a ground voltage to the second electrode. Moreover, the control unit obtains the detection results of the fourth electrode and the fifth electrode, and calculates coordinates of the first touch point and the second touch point along the first direction (X-dimension) at the same time according to the detection results of the fourth electrode and the fifth electrode and a voltage level of the first reference voltage.

In an embodiment of the invention, during a second dimension detection period (for example, a period of detecting y-dimension coordinates), the control unit provides a second reference voltage to the fourth electrode and the fifth electrode, and provides the ground voltage to the sixth electrode. Moreover, the control unit obtains the detection results of the first electrode and the third electrode, and calculates coordinates of the first touch point and the second touch point along the second direction (Y-dimension) at the same time according to the detection results of the first electrode and the third electrode and a voltage level of the second reference voltage.

According to the above descriptions, the detection area of the resistive touch panel is divided into a plurality of sub-detection areas through configuration of a plurality of electrodes (for example, six electrodes). In this way, based on a configuration relation of the electrodes, by controlling the voltage levels of the electrode and detecting the detection results of the corresponding electrodes, the resistive touch panel can calculate coordinates of touch points corresponding to the sub-detection areas at the same time, so as to achieve functions of detecting multiple touch points at the same time and detecting touch point sliding.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
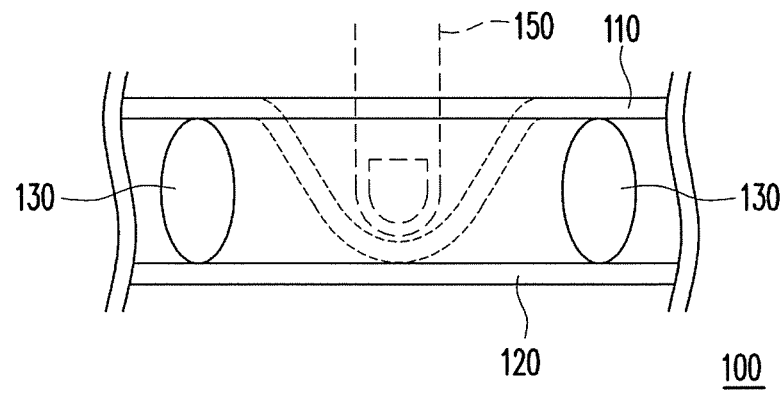
FIG. 1 is a schematic diagram illustrating a touch principle of a resistive touch panel.

Reference will now be made in detail to the present preferred embodiments of the invention, examples of which are illustrated in the accompanying drawings. Wherever possible, the same reference numbers are used in the drawings and the description to refer to the same or like parts.

A conventional resistive touch panel can only detect a position of a touch point when a single-touch operation is performed. However, when a user performs a multi-touch operation, or slides a touch point, the conventional resistive touch panel cannot correctly response.

Therefore, in a resistive touch panel of the invention, a detection area of the resistive touch panel is divided into a plurality of sub-detection areas based on a configuration relation of electrodes, and coordinates of touch points corresponding to the sub-detection areas are calculated at the same time, so as to achieve functions of detecting multiple touch points at the same time and detecting touch point sliding, etc. Further, in the invention, a unique electrode configuration architecture is used, by which a conventional touch point detecting method can also be used in the resistive touch panel of the invention, so as to greatly reduce development cost of the touch panel and save a development time to accelerate a production process. To fully convey the concept of the invention to those skilled in the art, the invention is introduced in detail below with reference of figures.

Figure 2:
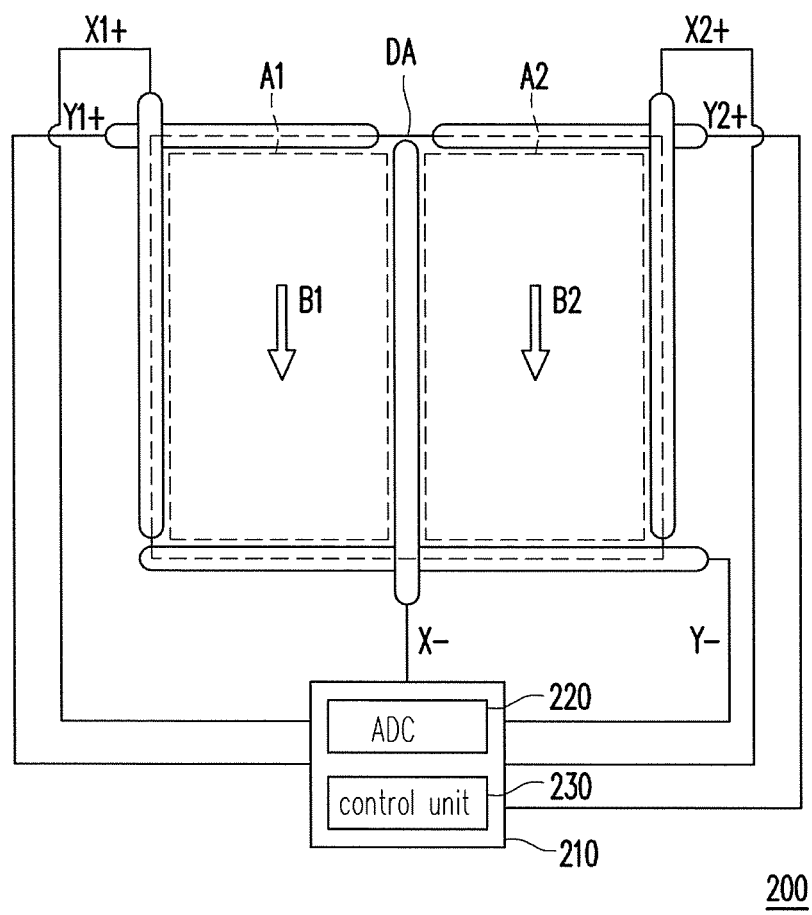
FIG. 2 is a schematic diagram of a resistive touch panel according to a first embodiment of the invention.
Figure 3:
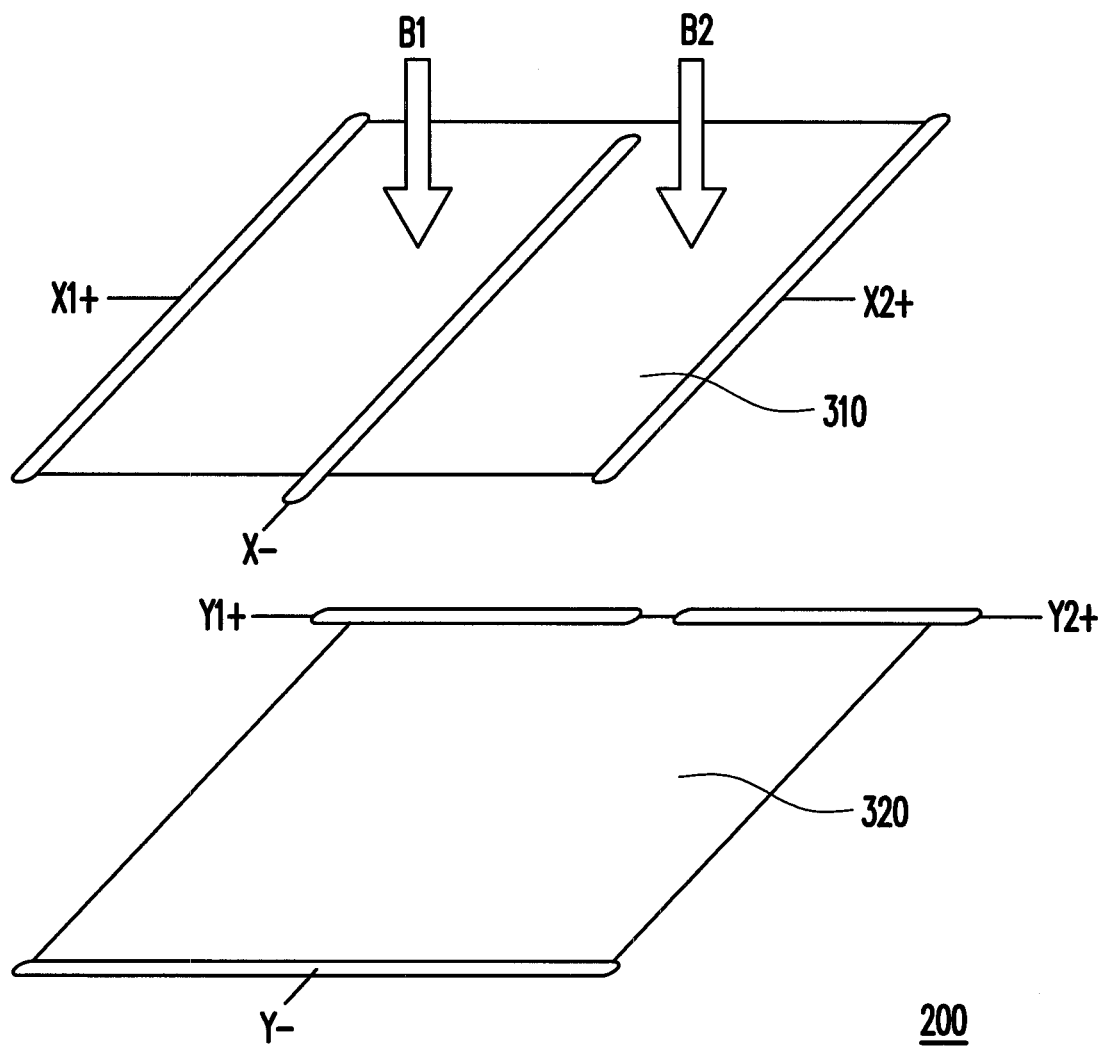
FIG. 3 is a schematic diagram of a conductive layer structure of the resistive touch panel according to the first embodiment of the invention.

FIG. 2 is a schematic diagram of a resistive touch panel 200 according to a first embodiment of the invention. FIG. 3 is a schematic diagram of a conductive layer structure of the resistive touch panel 200 according to the first embodiment of the invention. Referring to FIG. 2 and FIG. 3, the resistive touch panel 200 includes a first conductive layer 310 (for example, a soft upper conductive layer) and a second conductive layer 320 (for example, a lower conductive layer). The two conductive layers 310 and 320 are overlapped to each other to form a detection area DA of the resistive touch panel 200. It should be noticed that the terms "upper", "lower", "left" and "right" mentioned in the present embodiment are only used for describing the present embodiment with reference of figures, and the other embodiments of the invention are not limited thereto.

The first conductive layer 310 and the second conductive layer 320 are configured with a plurality of electrodes, and the electrodes divide the detection area DA into at least two sub-detection areas, for example, sub-detection areas A1 and A2 shown by dot lines in FIG. 2. The first conductive layer 310 and the second conductive layer 320 can be formed by indium tin oxide (ITO). In detail, a plurality of bar-shape ITO is used to form ITO layers to form the first conductive layer 310 and the second conductive layer 320. The bar-shape ITO of the two conductive layers 310 and 320 are perpendicular to each other. In other embodiments, the conductive layers 310 and 320 can also be formed by other conductive compounds, which is not limited by the invention.

In the present embodiment, the resistive touch panel 200 further includes a position processor 210. The position processor 210 is electrically connected to the electrodes to control voltage levels of the electrodes, and selectively receives a plurality of detection results from the electrodes to determine coordinates of two touch points B1 and B2 corresponding to the two sub-detection areas A1 and A2. In the present embodiment, the touch points B1 and B2 are represented by arrows. The position processor 210 can be connected to the resistive touch panel 200 through an external connection method, or can be built on a substrate of the resistive touch panel 200.

In the present embodiment, the first conductive layer 310 and the second conductive layer 320 are configured with at least six electrodes, and theses electrodes can be referred to as conductive bars or wires, etc. A material of the electrode can be liquid silver, though the material of the electrode is not limited thereto, and other conductive materials can also be used. Configuration of the conductive layer 310 and 320 and the electrodes can be as that shown in FIG. 3.

Referring to FIG. 3, the conductive layers 310 and 320 are respectively configured with electrodes of different dimensions, for example, a first electrode (for example, an electrode X1+), a second electrode (for example, an electrode X−) and a third electrode (for example, an electrode X2+) are disposed on the first conductive layer 310, so that these electrodes (the electrodes X1+, X− and X2+) are electrically connected to the first conductive layer 310. A fourth electrode (for example, an electrode Y1+), a fifth electrode (for example, an electrode Y2+) and a sixth electrode (for example, an electrode Y−) are disposed on the second conductive layer 320, so that these electrodes (the electrodes Y1+, Y2+ and Y−) are electrically connected to the second conductive layer 320.

It should be noticed that the electrode X1+, the electrode X− and the electrode X2+ are perpendicular to a first direction (for example, an X-axis direction), and the electrode Y1+, the electrode Y2+ and the electrode Y− are perpendicular to a second direction (for example, a Y-axis direction). The electrode X1+ and the electrode X2+ are respectively disposed at a left side and a right side of the detection area DA, and the electrode X− is disposed between the electrode X1+ and the electrode X2+. According to FIG. 3, it is known that the electrode Y1+ and the electrode Y2+ are disposed on a same straight line, and the electrode X− separates the electrode Y1+ and the electrode Y2+, and the electrode Y− is disposed between the electrode X1+ and the electrode X2+.

In the present embodiment, to facilitate describing the embodiment, the electrode X− is disposed in the middle of the detection area DA. Namely, a distance between the electrode X− and the electrode X1+ is equal to a distance between the electrode X− and the electrode X2+, so that the detection area DA is equally divided into two sub detection areas A1 and A2. However, in an actual application, the spirit of the invention is met as long as the electrode X− is disposed between the electrode X1+ and the electrode X2+, and a configuration position of the electrode X− is not limited by the embodiment.

Referring to FIG. 2, the position processor 210 includes a high impedance analog-to-digital converter (ADC) 220 and a control unit 230. The ADC 220 receives detection results (for example, voltage values) of analog-type from the electrode X1+ and the electrode X2+, or from the electrode Y1+ and the electrode Y2+ according to a demand of the control unit 230 for converting into the detection results of digital-type. The control unit 230 may execute a touch point detecting procedure to control the voltage levels of the electrodes, and determine the first touch point B1 and the second touch point B2 corresponding to the sub-detection areas A1 and A2 at the same time according to the detection results.

Figure 4:
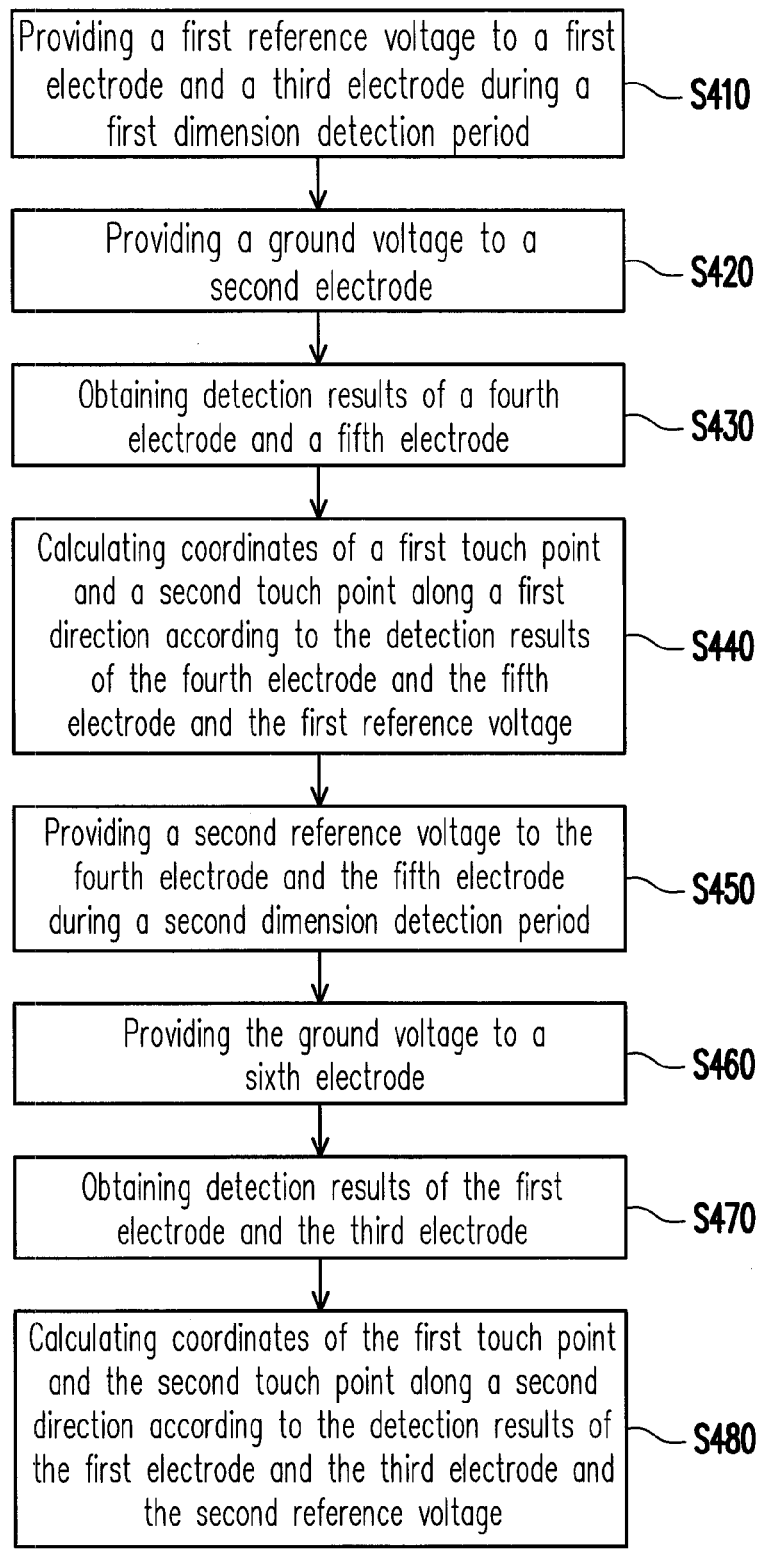
FIG. 4 is a flowchart illustrating a touch point detecting procedure executed by a control unit according to the first embodiment of the invention.
Figure 5A:
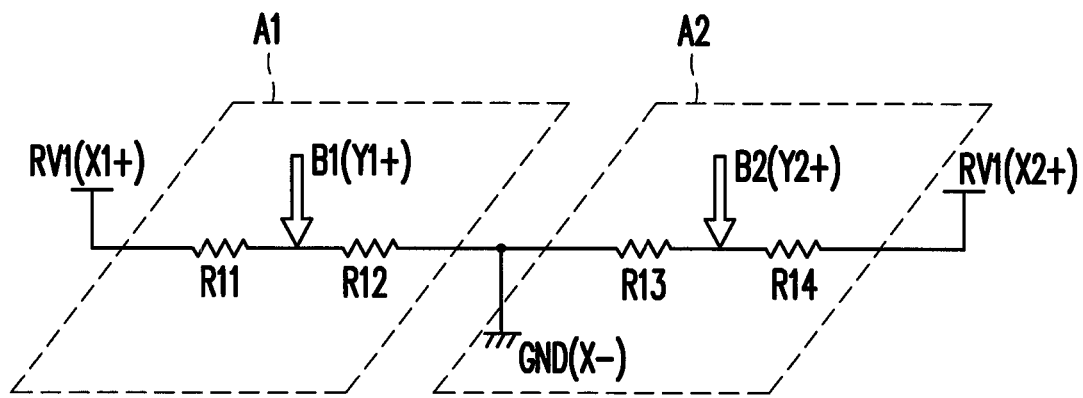
FIG. 5A and FIG. 5B are equivalent circuit schematic diagrams of a resistive touch panel detecting X-dimension coordinates or Y-dimension coordinates of touch points B1 and B2.
Figure 5B:
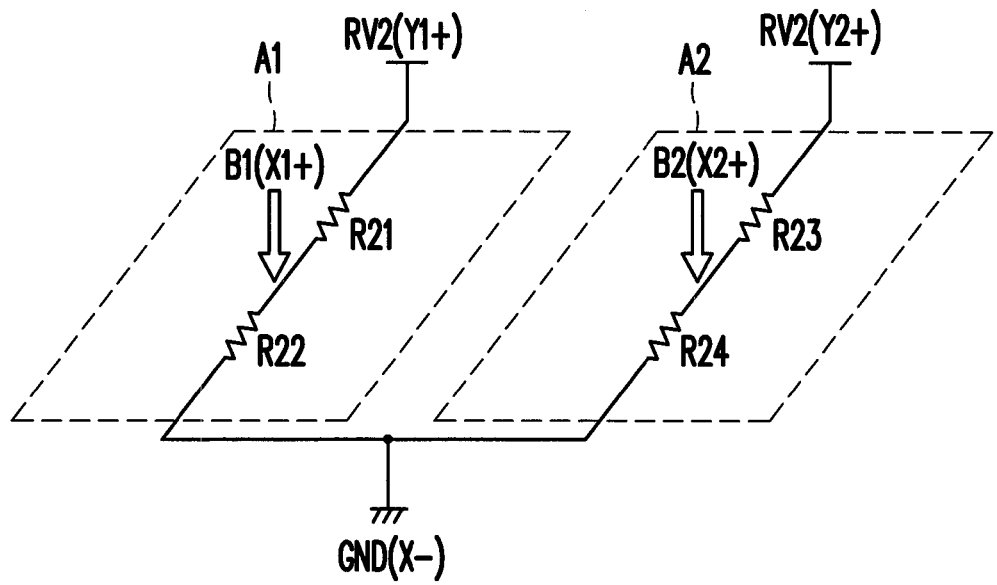

FIG. 4 is a flowchart illustrating the touch point detecting procedure executed by the control unit 230 according to the first embodiment of the invention. FIG. 5A and FIG. 5B are equivalent circuit schematic diagrams of the resistive touch panel 200 detecting X-dimension coordinates or Y-dimension coordinates of the touch points B1 and B2. Steps of the touch point detecting procedure executed by the control unit 230 are described with reference of FIG. 4, and examples are provided by FIG. 5A and FIG. 5B.

Here, it is assumed that the user has pressed the resistive touch panel 200 to simultaneously produce the two touch points B1 and B2 in the sub-detection areas A1 and A2, so that in FIG. 5A, equivalent resistors R11 and R12 are respectively formed between the touch point B1 and the electrode X1+ and between the touch point B1 and the electrode X−, and equivalent resistors R13 and R14 are respectively formed between the touch point B2 and the electrode X− and between the touch point B2 and the electrode X2+. Comparatively, in FIG. 5B, equivalent resistors R21 and R22 are respectively formed between the touch point B1 and the electrode Y1+ and between the touch point B1 and the electrode Y−, and equivalent resistors R23 and R24 are respectively formed between the touch point B2 and the electrode Y2+ and between the touch point B2 and the electrode Y−. Moreover, the electrodes in brackets are specific electrodes that the control unit 230 provides specific voltages thereto, or the control unit 230 receives the detection results there from.

Referring to FIG. 4 and FIG. 5A, in step S410, during a first dimension detection period (for example, a period of detecting X-dimension coordinates), the control unit 230 provides a first reference voltage RV1 to the first electrode (the electrode X1+) and the third electrode (the electrode X2+), and in step S420, provides a ground voltage GND to the second electrode (the electrode X−). Now, the control unit 230 does not provide voltages to the electrode Y1+, the electrode Y2+ and the electrode Y−.

Since the touch points B1 and B2 may electrically connect the conductive layers 310 and 320 of FIG. 3, in step S430, the ADC 220 respectively receives the detection results (for example, detection voltage values Vbx1 and Vbx2) of analog-type of the touch points B1 and B2 at the X-dimension from the fourth electrode (the electrode Y1+) and the fifth electrode (the electrode Y2+). The ADC 220 converts the analog-type detection voltage values Vbx1 and Vbx2 into the detection voltage values Vbx1 and Vbx2 of digital-type. In step S440, the control unit 230 calculates coordinates of the first touch point B1 and the second touch point B2 along the first direction (X-dimension) at the same time according to the detection results of the electrode Y1+ and the electrode Y2+ and a voltage level of the first reference voltage RV1.

Calculation method of the control unit 230 in the step S440 is described in detail below. According to FIG. 5A, it is known that the closer the touch point B1 approaches to the electrode X-located in the middle of the detection area DA, the closer the detection voltage value Vbx1 approaches to the ground voltage (0V). Therefore, the X-dimension coordinates of the touch points B1 and B2 can be determined by detecting magnitudes of the voltage values Vbx1 and Vbx2.

In detail, the voltage levels of the voltage values Vbx1 and Vbx2 are represented by following equations (1) and (2):

$$Vbx1 = RV1 \times \frac{R11}{R11 + R12} \quad (1)$$

$$Vbx2 = RV1 \times \frac{R13}{R13 + R14} \quad (2)$$

Therefore, since the first reference voltage RV1 is known, and the conductive layers 310 and 320 are even resistive conductive layers, the control unit 230 can obtain the X-dimension coordinates X1 and X2 of the touch points B1 and B2 relative to the electrode X− according to ratios of the voltage values Vbx1 and Vbx2 and the voltage value of the first reference voltage RV1.

Referring to FIG. 4 and FIG. 5B, steps S450-S480 are described below. In the step S450, during a second dimension detection period (for example, a period of detecting Y-dimension coordinates), the control unit 230 provides a second reference voltage RV2 to the fourth electrode (the electrode Y1+) and the fifth electrode (the electrode Y2+), and in step S460, provides the ground voltage GND to the sixth electrode (the electrode Y−). Now, the control unit 230 does not provide voltages to the electrode X1+, the electrode X2+ and the electrode X−.

Similar to the descriptions of the steps S410-S440, since the touch points B1 and B2 may electrically connect the conductive layers 310 and 320 of FIG. 3, in step S470, the ADC 220 respectively receives the analog-type detection results (for example, detection voltage values Vby1 and Vby2) of the touch points B1 and B2 at the Y-dimension from the first electrode (the electrode X1+) and the third electrode (the electrode X2+). The ADC 220 converts the detection voltage values Vby1 and Vby2 of analog-type into the detection voltage values Vby1 and Vby2 of digital-type. In step S480, the control unit 230 calculates coordinates of the first touch point B1 and the second touch point B2 along the second direction (Y-dimension) at the same time according to the detection results of the electrode X1+ and the electrode X2+ and a voltage level of the second reference voltage RV2.

Calculation method of the control unit 230 in the step S480 is described in detail below. Similar to the step S440, the closer the touch point B1 approaches to the electrode Y− located at a lower part of the detection area DA, the closer the detection voltage value Vby1 approaches to the ground voltage (0V). Therefore, the Y-dimension coordinates of the touch points B1 and B2 can be determined by detecting magnitudes of the voltage values Vby1 and Vby2.

In detail, the voltage levels of the voltage values Vby1 and Vby2 are represented by following equations (3) and (4):

$$Vby1 = RV2 \times \frac{R22}{R21 + R22} \quad (3)$$

$$Vby2 = RV2 \times \frac{R24}{R23 + R24} \quad (4)$$

Therefore, since the second reference voltage RV2 is known, and the conductive layers 310 and 320 are even resistive conductive layers, the control unit 230 can obtain the Y-dimension coordinates Y1 and Y2 of the touch points B1 and B2 according to ratios of the voltage values Vby1 and Vby2 and the voltage value of the second reference voltage RV2.

According to the above descriptions, the resistive touch panel 200 can simultaneously obtain the coordinates B1 (X1, Y1) and B2 (X2, Y2) of the touch points B1 and B2. Therefore, the detection area DA of the resistive touch panel 200 can be divided into a plurality of sub-detection areas according to a configuration relation of the electrodes, and the corresponding touch point in each of the sub-detection regions can be detected at the same time, so as to achieve functions of detecting multiple touch points at the same time. In the present embodiment, when two fingers of the user respectively and simultaneously press the sub-detection areas A1 and A2, and then immediately stop pressing, the corresponding information product can receive input information of the resistive touch panel 200 to execute a "cancel" action. Moreover, when the two fingers of the user respectively and simultaneously press the sub-detection areas A1 and A2 for a period of time, the information product can receive the input information of the resistive touch panel 200 to execute a "print" action.

Moreover, in the present embodiment, since the electrode X− divides the detection area DA into the two sub-detection areas A1 and A2 in FIG. 2, the resistive touch panel 200 can easily detect a sliding trail that a touch point slides from the sub-detection area A1 to the sub-detection area A2 (i.e. the touch point is kept to be pressed and slid from a left side to a right side of the resistive touch panel 200), or a sliding trail that a touch point slides from the sub-detection area A2 to the sub-detection area A1 (i.e. the touch point is kept to be pressed and slid from the right side to the left side of the resistive touch panel 200), so that the resistive touch panel 200 can implement the function of detecting touch point sliding.

In the present embodiment, when the user presses a finger at the left side of the resistive touch panel 200, and keeps pressing and slides the finger to the right side, the information product can receive the input information of the resistive touch panel 200 to execute a "next/cancel return" action. Moreover, when the user presses a finger at the right side of the resistive touch panel 200, and keeps pressing and slides the finger to the left side, the information product can receive the input information of the resistive touch panel 200 to execute a "back/return" action.

Accordingly, compared to the related touch panel detecting techniques capable of performing multi-touch, cost of a capacitive touch panel is far higher than that of the resistive touch panel, and a unique capacitive touch module control chip is required. Comparatively, in the invention, a unique electrode configuration architecture is used, by which the conventional touch point detecting method can also be used in the resistive touch panel of the invention, so as to greatly reduce development cost of the touch panel and save a development time to accelerate a production process.

Figure 6:
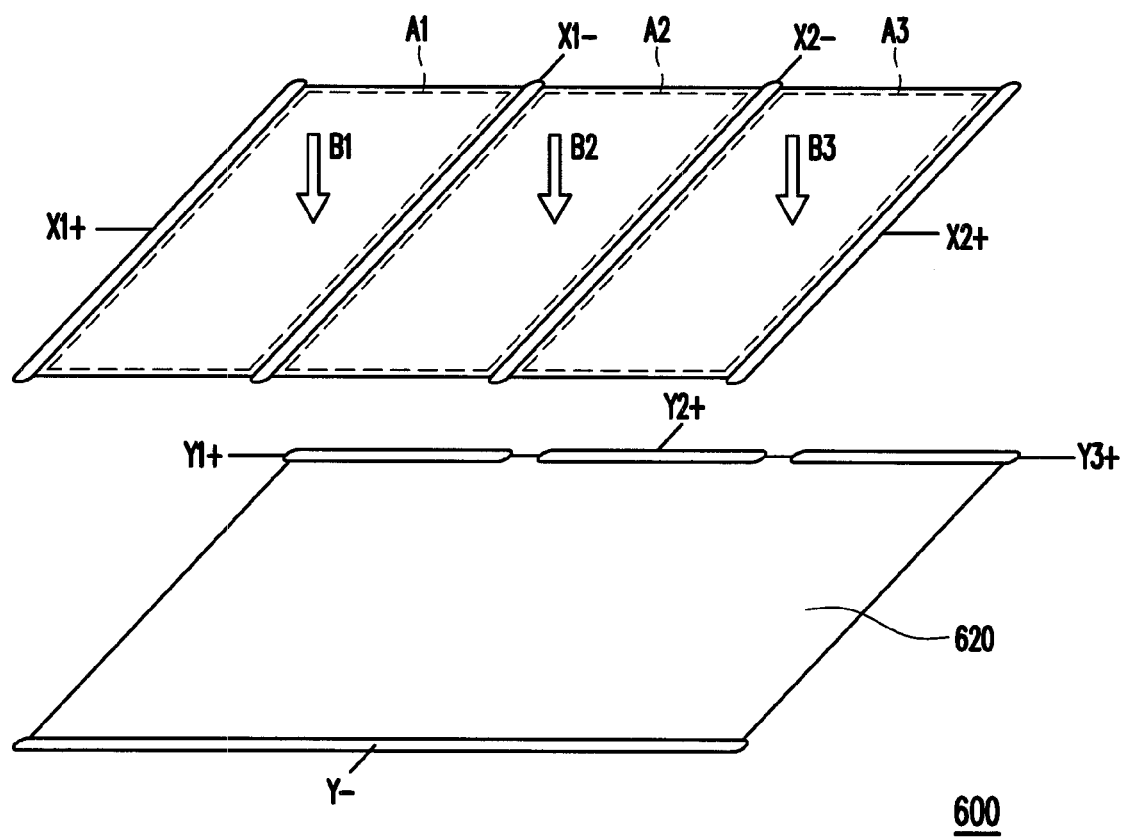
FIG. 6 is a schematic diagram of a conductive layer structure of a resistive touch panel according to a second embodiment of the invention.

According to the above descriptions, those skilled in the art can divide the detection area DA into a plurality of sub-detection areas by using the aforementioned configuration relation of the electrodes. Another embodiment is provided for a detailed description. FIG. 6 is a schematic diagram of a conductive layer structure of a resistive touch panel 600 according to a second embodiment of the invention. An actuation method and a structure of the present embodiment are similar to that of the first embodiment, and the first embodiment can be referred to implement the present embodiment.

A difference between the first embodiment and the second embodiment is that a first conductive layer 610 is configured with electrodes X1+, X2+, X1− and X2− that are parallel to each other and perpendicular to the X-axis direction, and a second conductive layer 620 is configured with electrodes Y1+, Y2+, Y3+ and Y− that are parallel to each other and perpendicular to the Y-axis direction. The electrode X1− and the electrode X2− are located in the middle of the detection area DA for dividing configuration positions of the electrodes Y1+, Y2+ and Y3+. In this way, the detection area DA can be divided into three sub-detection areas A1-A3 through the configuration of the electrodes, so that the resistive touch panel 600 can obtain the coordinates of the touch points B1-B3 in the sub-detection regions A1-A3 at the same time, so as to achieve functions of detecting multiple touch points at the same time and detecting touch point sliding.

Accordingly, when the resistive touch panel 600 is used to perform the X-dimension detection flow of the touch point detecting procedure, different voltage levels are respectively provided to the electrode X1+, the electrode X2+, the electrode X1− and the electrode X2−. The voltage levels of the adjacent electrodes cannot be the same, namely, the voltage levels provided to the electrode X1+ and the electrode X1−, the voltage levels provided to the electrode X1− and the electrode X2−, and the voltage levels provided to the electrode X2− and the electrode X2+ are respectively different. Therefore, the resistive touch panel 600 can obtain corresponding detection results from the electrode Y1+, the electrode Y2+ and the electrode Y3+, and an equivalent voltage division principle is used to simultaneously calculate the X-axis coordinates of the touch points B1-B3.

Similarly, when the resistive touch panel 600 is used to perform the Y-dimension detection flow of the touch point detecting procedure, voltage levels are respectively provided to the electrodes Y1+-Y3+ and the electrode Y−, where the voltage levels provided to the electrodes Y1+-Y3+ can be the same, and the ground voltage GND is provided to the electrode Y− as that does of the first embodiment. Therefore, the resistive touch panel 600 can obtain corresponding detection results from the electrode X1+, the electrode X1− (or the electrode X2−) and the electrode X2+, and the equivalent voltage division principle is used to simultaneously calculate the Y-axis coordinates of the touch points B1-B3.

In summary, the detection area of the resistive touch panel is divided into a plurality of sub-detection areas through configuration of a plurality of electrodes (for example, six electrodes). In this way, based on the configuration relation of the electrodes, by controlling the voltage levels of the electrodes and detecting the detection results of the corresponding electrodes, the resistive touch panel can calculate coordinates of touch points corresponding to the sub-detection areas at the same time, so as to achieve functions of detecting multiple touch points at the same time and detecting touch point sliding.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A resistive touch panel, comprising:
   a first conductive layer; and
   a second conductive layer, wherein a plurality of electrodes is disposed on the first conductive layer and the second conductive layer, and the electrodes divide a detection area of the resistive touch panel into at least two sub-detection areas,
   wherein the electrodes comprises:
   a first electrode, a second electrode and a third electrode, wherein configuration positions of the first electrode, the second electrode and the third electrode are parallel to each other, and are perpendicular to a first direction, and the second electrode is disposed between the first electrode and the third electrode; and
   a fourth electrode, a fifth electrode and a sixth electrode, wherein configuration positions of the fourth electrode, the fifth electrode and the sixth electrode are parallel to each other, and are perpendicular to a second direction, the second electrode separates the fourth electrode and the fifth electrode, and the sixth electrode is disposed between the first electrode and the third electrode,
   wherein the second electrode divides the detection area into a first sub-detection area and a second sub-detection area.

2. The resistive touch panel as claimed in claim 1, wherein the first electrode, the second electrode and the third electrode are disposed on the first conductive layer, and the fourth electrode, the fifth electrode and the sixth electrode are disposed on the second conductive layer.

3. The resistive touch panel as claimed in claim 2, wherein the fourth electrode and the fifth electrode are disposed on a same straight line.

4. The resistive touch panel as claimed in claim 1, further comprising:
   a position processor, controlling voltage levels of the electrodes, and selectively receiving a plurality of detection results from the electrodes to determine at least two touch points corresponding to the at least two sub-detection areas.

5. The resistive touch panel as claimed in claim 4, wherein the at least two sub-detection areas comprises a first sub-detection area and a second sub-detection area, and the position processor comprises:
   an analog-to-digital converter (ADC), receiving the detection results of analog-type from the first electrode and the third electrode, or from the fourth electrode and the fifth electrode for converting into the detection results of digital-type; and
   a control unit, controlling the voltage levels of the electrodes to determine the first touch point and the second touch point corresponding to the first sub-detection area and the second sub-detection area according to the detection results.

6. The resistive touch panel as claimed in claim 5, wherein during a first dimension detection period, the control unit provides a first reference voltage to the first electrode and the third electrode, and provides a ground voltage to the second electrode, obtains the detection results of the fourth electrode and the fifth electrode, and calculates coordinates of the first touch point and the second touch point along the first direction at the same time according to the detection results of the fourth electrode and the fifth electrode and a voltage level of the first reference voltage.

7. The resistive touch panel as claimed in claim 6, wherein during a second dimension detection period, the control unit provides a second reference voltage to the fourth electrode and the fifth electrode, and provides the ground voltage to the sixth electrode, obtains the detection results of the first electrode and the third electrode, and calculates coordinates of the first touch point and the second touch point along the second direction at the same time according to the detection results of the first electrode and the third electrode and a voltage level of the second reference voltage.

8. The resistive touch panel as claimed in claim 1, wherein the first conductive layer and the second conductive layer are respectively formed by an indium tin oxide (ITO) layer.

* * * * *